June 12, 1962  W. C. MOORE  3,038,466
ORIFICIAL INSTRUMENT CONSTRUCTION
Filed April 28, 1958
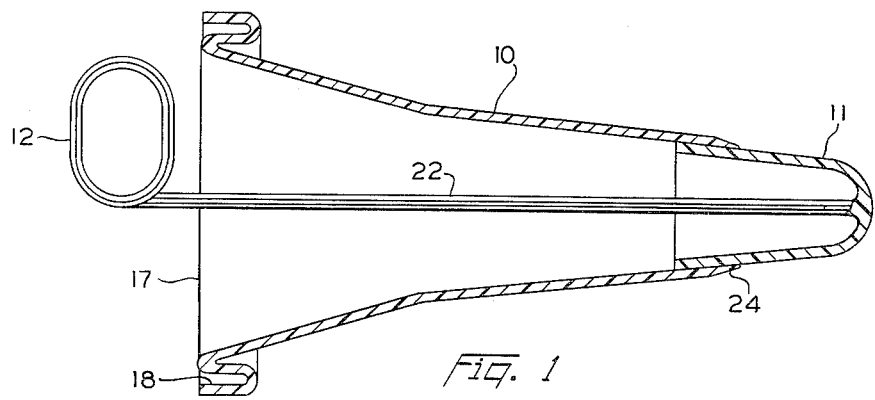
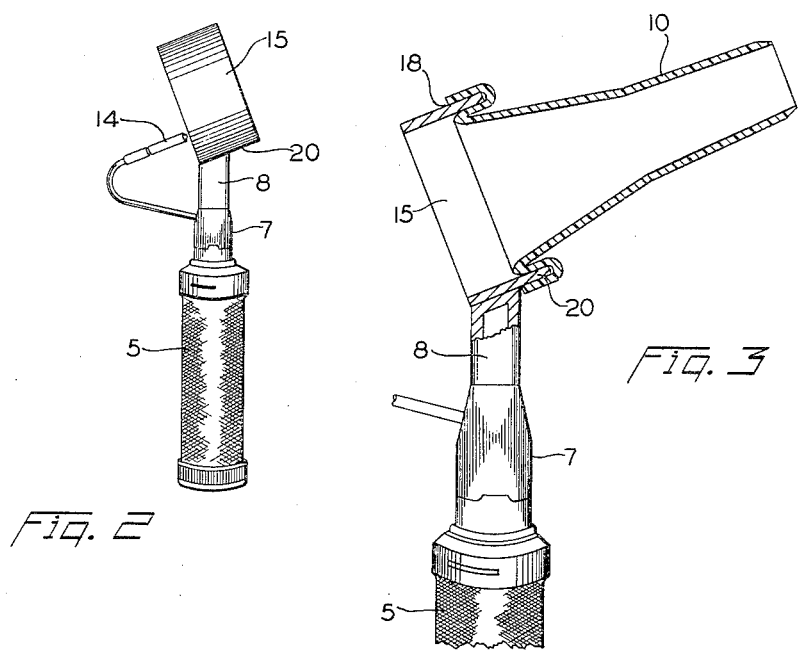
*INVENTOR.*
WILLIAM C. MOORE
BY
Atty.

United States Patent Office 3,038,466
Patented June 12, 1962

3,038,466
ORIFICIAL INSTRUMENT CONSTRUCTION
William C. Moore, Skaneateles, N.Y., assignor to Welch Allyn, Inc., Skaneateles Falls, N.Y., a corporation of New York
Filed Apr. 28, 1958, Ser. No. 731,451
3 Claims. (Cl. 128—4)

This invention relates generally to medical diagnostic instruments of the class employed for examination of body cavities, and has particular reference to a novel construction for an anoscope wherein the body entering portions of the instrument are expendable and may be disposed of after use.

Whenever a medical instrument is inserted into a body cavity, it must of course be sterilized before it can be used again. This means that in a busy physician's office or clinic it may be necessary to sterilize an instrument many times each day and it may also be necessary to provide several instruments of the same kind in order to have one available for use at all times. The necessity for sterilization, therefore, frequently entails a considerable amount of time and inconvenience and may involve a sizeable expense as well.

In the present invention, the primary object is to completely eliminate the need for sterilizing by providing an instrument having a very inexpensive, disposable body entering portion which can be thrown away after use and replaced with a sterile new part. Thus, in the anoscope construction disclosed, the body entering speculum is disposable while the speculum support, which does not normally contact the patient and does not need to be sterilized, is permanent and can be used over and over again.

In addition to the broad objective stated above, another important object of the invention is to provide an instrument of the character described wherein the obturator, which is positioned in the speculum when it is inserted, is also disposable.

A further important object of the invention is to provide an instrument of the character described wherein the disposable parts thereof can be formed of inexpensive material by mass production methods so that the cost of each part is not more than a few cents.

A still further important object of the invention is to provide an instrument of the character described wherein the disposable speculum may be quickly and easily attached to and removed from the speculum holder.

Other objects and advantages of the invention will become apparent from the following detailed description thereof read in conjunction with the accompanying drawings which illustrate a representative embodiment of the invention for the purpose of disclosure.

In the drawings:

FIGURE 1 is a vertical longitudinal section through a disposable speculum and obturator embodying the invention;

FIGURE 2 is a side elevation of a battery handle having a speculum holder embodying the invention mounted thereon; and FIGURE 3 is a fragmentary side elevation corresponding to the upper portion of FIGURE 2 illustrating the manner in which the disposable speculum is mounted on the speculum holder, the speculum and a portion of the holder being shown in section.

Having reference now to the drawings, wherein like reference numbers designate the same part in each of the views, the anoscope is essentially comprised of a battery handle 5, light carrier 7, speculum holder 8 and disposable speculum 10, the battery handle and light carrier being of substantially conventional design. The instrument also includes a disposable obturator 11 which is positioned in the speculum when the instrument is inserted into the body cavity and provides the speculum with a relatively smooth, tapered entering portion. After the speculum has been fully inserted in the cavity, the obturator is removed by means of a handle 12 at the proximal end thereof which permits the physician to look through the speculum with the aid of a small lamp 14 mounted on the light carrier, the latter being electrically connected to the battery handle in the usual manner.

The speculum holder 8 is detachably secured to the light carrier 7 and is formed at its upper end with a ring shaped portion 15 on which the proximal end of the speculum 10 is adapted to be mounted in a manner to be presently explained. The disposable speculum is a hollow, substantially frusto-conical body which is open at its base and apex ends to permit a viewing passage therethrough. The speculum is preferably formed of a plastic material which is drawn or moulded into the desired shape, the material being of sufficient thickness so that the speculum will retain its conical shape when inserted in the body passage. Additional rigidity is imparted to the speculum by the obturator 11 and by the holder ring portion 15 on which the speculum is mounted when in use.

In order to enable the disposable speculum to be releasably yet firmly connected to the speculum holder, it is provided at its proximal end 17 with a relatively deep annular channel 18 which is adapted to frictionally engage a portion of the holder ring 15 as shown in FIGURE 3. Channel 18 is formed integrally with the remainder of the speculum, the material adjacent the proximal end thereof being turned outwardly and bent into a reverse curve configuration so that the channel extends continuously around the outside of the speculum. With this arrangement, the channel does not obstruct the viewing passage through the interior of the speculum. The interior width of channel 18 is equal to the thickness of the holder ring 15 so that the channel side walls will frictionally engage the ring when the speculum is mounted thereon. In this connection, it will be noted that one side of the ring projects outwardly beyond the stem portion of the speculum holder as at 20 to provide a relatively wide unobstructed rim which will extend all the way into the speculum channel and ensure a firm connection therebetween.

The obturator 11 is also formed of plastic material which may be moulded into the shape shown. The rounded distal end portion of the obturator can be either hollow or solid and is preferably formed integrally with the stem portion 22 which extends rearwardly and terminates in the handle 12. The distal end portion of the obturator is formed with a tapered wall which frictionally engages the tapered wall at the distal end of the speculum 10, the outside edge of the latter being rounded as at 24 to present a substantially smooth exterior surface when the parts are assembled for use.

Because of the frusto-conical shape of the disposable speculum 10, a number of them can be stacked together in a single package or they can be packaged individually with an obturator positioned inside. In either case, when the anoscope is to be used, the physician needs only to snap a disposable speculum in position on the holder ring and insert a disposable obturator, both of which are sterile as received from the package. As soon as the instrument has been inserted into the body cavity, the obturator can be withdrawn and thrown away, and after the examination has been completed the speculum can be released from the holder ring and disposed of by simply pushing outwardly on the rear edge of the channel 18 and allowing the speculum to drop into a waste receptacle. Since the battery handle and speculum holder do not enter the cavity, sterilization of the remaining, permanent portion of the instrument is unnecessary.

As will be apparent to those familiar with the art, the invention may be embodied in other specific forms without departing from the spirit or essential characteristics thereof. The embodiment disclosed is therefore to be considered in all respects as illustrative rather than restrictive, the scope of the invention being indicated by the appended claims.

What is claimed is:

1. In an anoscope including a handle and a speculum holder mounted on said handle, said speculum holder comprising an upstanding stem portion and an obliquely disposed ring member supported by said stem portion, one side of said ring member projecting outwardly from said stem portion and being completely unobstructed about its periphery, a disposable unitary speculum formed of non-metallic pliant material, said speculum being substantially frusto-conical in shape and having an annular channel adjacent the proximal end thereof, said annular channel having an inside width equal to the thickness of said ring member and frictionally engaging the unobstructed side of the member to connect said speculum and speculum holder together.

2. In a medical diagnostic instrument including a handle and a speculum holder mounted on said handle, said speculum holder being formed with an upstanding open-ended ring shaped portion, a disposable speculum of relatively thin pliant material, said speculum being substantially frusto-conical in shape and being turned outwardly and bent into a reverse curve configuration adjacent the proximal end thereof to form an integral annular channel encircling the exterior of the speculum, said channel frictionally engaging one side of said upstanding ring shaped portion to releasably connect said speculum to said speculum holder.

3. In an anoscope including a handle and a speculum holder mounted on said handle, said speculum holder including an upstanding ring member; the combination comprising a disposable speculum formed of non-metallic pliant material releasably connected to said holder, and a disposable obturator formed of non-metallic pliant material positioned in said speculum when the latter is inserted in a body cavity, said speculum being substantially frusto-conical in shape and having an integral annular channel encircling the proximal end thereof, said channel engaging one side of said speculum holder ring member to connect said speculum and holder together.

References Cited in the file of this patent

UNITED STATES PATENTS

| | | |
|---|---|---|
| 411,160 | Maloney | Sept. 17, 1889 |
| 1,588,791 | De Zeng | June 15, 1926 |
| 2,507,771 | Cole | May 16, 1950 |
| 2,769,441 | Abramson | Nov. 6, 1956 |
| 2,797,684 | Moore | July 2, 1957 |
| 2,816,548 | Tupper | Dec. 17, 1957 |

FOREIGN PATENTS

| | | |
|---|---|---|
| 154,241 | Austria | Sept. 10, 1938 |

OTHER REFERENCES

The National Body Cavity Set, pages 336–337, of Aloe Hospital Catalogue, copyright 1942. Copy in Div. 55.